United States Patent [19]
Dollhopf et al.

[11] Patent Number: 5,883,816
[45] Date of Patent: Mar. 16, 1999

[54] INTERFACE CIRCUIT FOR PROCESSOR CONTROLLED SYSTEM AND VEHICLE LAUNDRY SYSTEM UTILIZING SUCH INTERFACE CIRCUIT

[75] Inventors: Kenneth J. Dollhopf, Livonia; Richard L. Stoolmaker, Linden, both of Mich.

[73] Assignee: Belanger, Inc., Northville, Mich.

[21] Appl. No.: 543,051

[22] Filed: Oct. 13, 1995

[51] Int. Cl.$^6$ .................................................. H02H 1/06
[52] U.S. Cl. .......................... 364/528.28; 702/58; 361/1
[58] Field of Search ................................. 364/492, 482, 364/481, 140, 138, 141, 528.21, 528.27, 528.28, 528.3; 307/41, 31, 35, 38, 98, 99, 113, 116; 361/1, 64, 63, 81, 93, 114, 100; 340/644; 367/197; 702/58

[56] References Cited

U.S. PATENT DOCUMENTS

| | | | |
|---|---|---|---|
| 3,697,768 | 10/1972 | Johnston | 307/31 |
| 3,854,054 | 12/1974 | Conn, Jr. | 307/41 |
| 4,249,162 | 2/1981 | Nakamura | 340/148 |
| 4,893,229 | 1/1990 | Detrick | 364/140 |
| 5,373,411 | 12/1994 | Grass et al. | 361/64 |
| 5,506,573 | 4/1996 | Ewing et al. | 340/644 |

Primary Examiner—M. Kemper
Attorney, Agent, or Firm—Young & Basile, P.C.

[57] ABSTRACT

A smart module circuit board carries a programmable microprocessor and a plurality of relay type interface circuits for use in organizing relatively high voltage input devices and output devices into a complex system wherein a programmed combination of input device signals determines when and if to energize one or more output devices in the system. The interface circuit comprises input and output stages which operate on logic level voltages and which are decoupled by opto-couplers from a relatively high voltage energization circuit which passes through a relatively high voltage electrical device. The energization circuit comprises a triac which is operated by the output stage in response to outputs from the microprocessor, a manual switch connected in parallel with the triac so that a given electrical load device can be manually activated and a multi-colored LED for indicating the conditions of the input and output circuits individually and in combination. The smart modules are utilized in a vehicle laundry having a master computer for overall control of multiple smart modules, the microprocessor of each smart module being independently operable to control at least a portion of the laundry system in the event of a failure of the master computer.

5 Claims, 8 Drawing Sheets

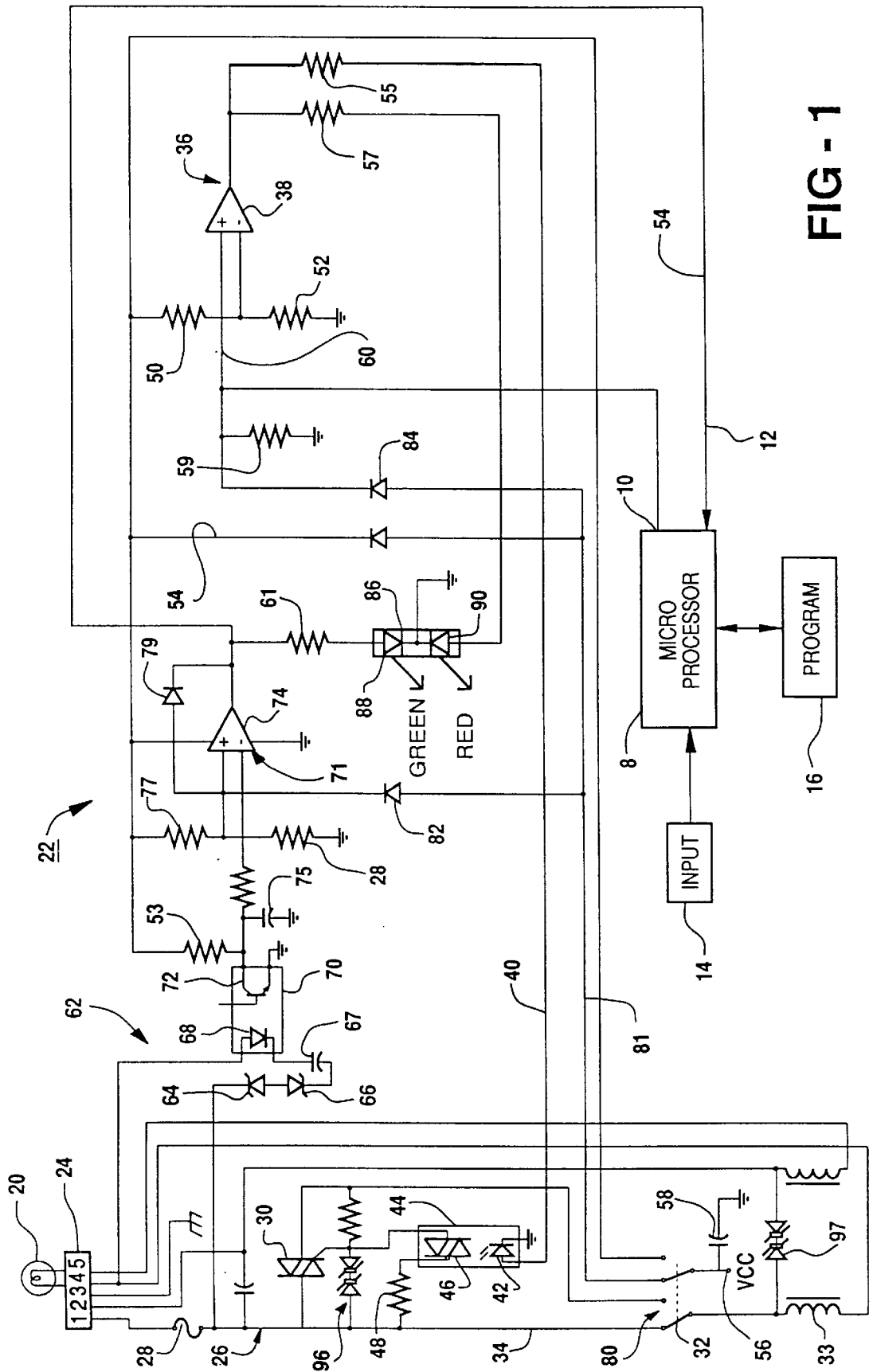

| CONDITION | INPUT | OUTPUT | TRIAC | LED |
|---|---|---|---|---|
| AUTO on LOAD OK COMMAND ON | LO | HI | ON | RED |
| AUTO on LOAD open | LO | LO | OFF | OFF |
| AUTO on LOAD OK NO COMMAND | HI | LO | OFF | GREEN |
| MANUAL on LOAD OK | LO | LO | OFF | AMBER |
| INPUT | HI | LO | OFF | GREEN |

FIG - 3

INTERFACE CIRCUIT FOR PROCESSOR CONTROLLED SYSTEM AND VEHICLE LAUNDRY SYSTEM UTILIZING SUCH INTERFACE CIRCUIT

FIELD OF THE INVENTION

This invention is in the field of circuits through which it is possible to electrically isolate, monitor and control electrical devices such as switches and motors. The invention pertains more particularly to a high flexibility interface circuit for (a) providing inputs from a first class of electrical devices to a controller and (b) applying output commands from the controller to a second class of electrical devices for the purpose of regulating the actions and functions of such devices in a complex system.

BACKGROUND OF THE INVENTION

There are many industrial uses of complex systems in which multiple and diverse electrical devices are electrically isolated, monitored and/or controlled by way of relay or relay-like circuits which may operate under the management control of a computer controller. By "controller" we refer to a management device such as a programmable digital processor which receives inputs in the form of electrical signals representing at least in part the conditions of a first class of real world electrical devices and which uses those inputs to create commands or outputs in the form of electrical signals which are applied directly or indirectly to a second class of real world electrical devices to determine the functional status thereof. The processor further relates or coordinates inputs to outputs according to a program defining the overall functions or function to be achieved by such devices in a complex system. By "real world" we refer to such devices as switches, solenoids and motors which are associated with work production and/or physical movement or other condition changes in an industrial system as opposed to mere calculations which might occur wholly within a data processor using only logic level signals. The controller may, as stated above, comprise at its heart a general purpose digital microprocessor chip capable of performing data processing and/or management tasks of many kinds. Alternatively, it may comprise a special purpose computer or even a hard wired circuit, the "program" portion of which is found in the form of hardware or firmware rather than the more traditional applications and operating system software. In general, however, complex systems in industrial applications of all kinds more and more typically include microprocessor chips which are not only flexible in operation and application, but are widely and inexpensively available from various sources and manufacturers such as Intel but are also widely and generally understood and used by engineers and technicians throughout the United States and the world.

An example of an industrial application comprising input type real world devices and output type real world devices operating in a complex system under the control of a data processor is a vehicle laundry wherein such operations as vehicle proximity detection, vehicle length and size assessment, soap spraying, water spraying, brushing, forced air drying, wheel washing and polishing are performed in spaced and overlapping sequences. In such a system, devices which provide condition or function-signaling inputs to a controller-programmer may include, by way of example and not by limitation, vehicle proximity detectors such as limit switches, wand switches and electric eyes, conveyor drive shaft angle encoders, emergency stop switches, keypads, coin boxes and a variety of other devices having contacts which create open and closed circuit conditions. Output or function-causing devices the excitation and operation of which are subject to a remote external control according to the management program found in a controller may include, by way of example and not by limitation, scrubbing brushes, air turbines, hydraulic and pneumatic cylinders, solenoids, pumps, lights, doors, wheel washers, motors and motor starting circuits.

In a more complex but nevertheless typical vehicle laundry it may be desirable to provide a variety of proffered service packages ranging from a simple wet wash to drying, waxing, the application of anti-corrosion agents and wheel washing. The customer may directly select such combinations by way of a credit card reader and keypad or may indirectly make such selections through an attendant who enters an appropriate code from a remote station and provides the customer with a coin or token or code input to simply initiate the operation of the system.

In addition various complex functions are or may be provided in a vehicle laundry such as vehicle proximity detection and vehicle size assessment thereby to schedule the energization and deenergization of various output devices in the system for the purpose of minimizing electrical energy consumption and cost.

In addition it is highly desirable to utilize a general purpose computer as part of the controller of a complex system in order that the general purpose digital computer be available for use in peripheral but related applications such as financial record keeping, maintenance record keeping and scheduling, payroll, employee attendance, machinery usage levels and other data collection and/or coordination functions which are typically associated with the conduct of a retail merchandizing operation. The general purpose computer may, however, be placed at the top of a hierarchy which includes lower order computers which are capable of independent action in the event the master computer experiences a failure or is temporarily unavailable.

Many other industrial applications of a complex nature involving input type electrical devices and output type electrical devices the energization and performance of which are to be coordinated by means of a controller will be apparent to those skilled in the art. Again by way of example and not by limitation, examples of such systems include baggage handling, conveyor systems, automated assembly systems, medical analysis and evaluation systems, access and security systems, construction machinery and other applications characterized by multiple operations on a common workpiece in sequential and coordinated fashion.

One of the problems associated with the construction and operation of complex systems operating under management of a computer-type controller is the typical need to customize electrical circuitry, particularly the interface circuitry which ties the real world electrical devices to the controller either as input devices or output devices. The devices themselves may vary as between simple input devices such as switches, and more complex and power-consuming output devices. In addition, the devices within a single class may vary widely as to excitation voltage and power consumption; e.g., a simple 100 watt filament type light bulb presents an entirely different electrical energization interfacing requirement than an induction motor that might be used to drive a high volume, high velocity air turbine.

Another problem confronting the control circuit designer is the desirability of providing not only for coordinated or integrated automatic control of the various controlled or output devices in a given system but also of providing for independent manual operation of selected devices and, moreover, of providing for overall operation in a coordinated fashion even though the master computer associated with the system may be down as a result of a malfunction or failure. It is doubtless a fact of life that many a complex and elegant computer controlled system has been rendered unproductive by reason of the failure of an inexpensive integrated circuit in a device upon which the overall system is dependent.

SUMMARY OF THE INVENTION

It is an object of this invention to provide an interface circuit having relay-like characteristics which is generally applicable to the task of interfacing various types of electrical devices having conductive and nonconductive conditions with a management device of the type described above; i.e., a controller of the type which is programmable to coordinate the functions of various real world electrical devices through the production of output commands and which is further capable of receiving inputs in the form of electrical data signals from other real world electrical devices and which exhibits flexibility in application and operation and in the accommodation of a wide variety of electrical devices of both input and output character.

It is a further object of this invention to provide an interface circuit of the character described above which provides not only for the programmed or automatic control of a wide variety of output type devices, but which also provides for the selective manual energization and operation of individual devices and which, at the same time, provides a logical input to the controller to show that a manual device operation or selection has occurred.

It is a further object of the invention to provide a relay-type interface circuit capable of controlling the application of power to a load device wherein the operating state of the interface circuit and the condition of the associated load device is visually displayed in an easily recognized and non-ambiguous fashion.

It is a further object of the invention to provide an interface circuit of the type and character described above which is utilizable in multiples and on circuit boards in a complex industrial system or device such as a vehicle laundry having multiple input type devices providing data signals as well as multiple output devices which receive commands for programmed operation.

It is a further object of the present invention to provide an interface circuit of the type and character described above in a complex industrial system of the type described above wherein the system operation is conducted under the control of a system having both master and local controller hierarchy such that a loss or failure of the master controller does not render the overall system inoperable but, rather, wherein full programmed and coordinated operation of the system is maintained by virtue of a microprocessors which are locally stationed on circuit boards preferably carrying multiple interface circuits.

It is a further object of the present invention to provide a controller for a complex industrial system consisting of input devices such as switches and output devices such as motors and lights wherein the output devices are called into service in accordance with conditions signalled by the input devices and coordinated by an overall function program. An example given by way of illustration is a vehicle laundry wherein vehicles travel through stations arranged along a conveyor line and are operated upon according to a predefined program. Input devices such as limit switches, and electric eyes and conveyor shaft angle encoders signal the presence of a vehicle at each of the stations as well as the operative condition of the devices associated with each station. If a logically-coordinated set of conditions is satisfied; as evidenced by appropriate input signals to the controller; e.g., (a) vehicle present, (b) function-performing device operative, (c) function selected, and (d) no emergency stop signal present, the controller creates an output to a function-causing device turning that device on at and for a prescribed time.

The controller is preferably arranged on a circuit board with multiple input/output device interfaces and equipped with sufficient local memory to carry out the programming needs of a number of output devices as well as at least the input devices associated with those output devices; e.g., a soap dispenser pump and the liquid level detector in the soap reservoir. The combination of the controller and the multiple interfaces is termed a "smart module."

Preferably, each interface circuit is equipped with a remote switch to turn a device on and off under the control of the controller, and a manual switch by which the device may be turned on and off independent of a function-coordinating program. Moreover, each interface circuit is preferably, but not necessarily, equipped with a visual indicator to display its operating status; e.g., AUTO, MANUAL and OFF.

These and other objects and advantages of the invention will be best understood from the reading and understanding of the following specification in which the design and operation of an illustrative interface circuit is given in combination with the disclosure of a vehicle laundry system utilizing multiple interface circuits of the type and character described in detail herein.

Specifically, in the interface circuit illustratively described herein is of the type suitable for use in a combination with various controllers including microprocessor type controller which can produce command signals or outputs for controlling through the interface circuit the condition of a first class of electrical devices and which is capable of receiving via the interface circuit signals in electrical form supplied thereto in accordance with the operating condition of another second class of electrical devices. The interface circuit preferably comprises:

A) a relatively high voltage electrical device energization circuit having a first switch therein for opening and closing the circuit, usually in response to a command signal produced by a controller;

B) a relatively low voltage circuit adapted to receive commands from a controller and an output coupled to the first switch means to place the first switch means in an open circuit condition or a closed circuit condition according to the content of the input command;

C) a second switch means, possibly intended for manual operation, in the electrical device energization circuit also for opening and closing the circuit independently of the first switch means;

D) means interconnecting the second switch means to the input of the command circuit for providing a command equivalent signal thereto when the second switch means is in the closed circuit condition thereby to enable the circuit as if a command had been produced;

E) sensing means, illustratively in the form of a high resistivity shunt circuit connected to an opto-coupler, coupled to the energization circuit and having a first output signal condition when the circuit is closed and a second different output signal condition when the circuit is opened; and F) a relatively low voltage controller input circuit means coupled to the sensing means to produce an input to the controller according to the signal condition of the sensing means.

In the preferred form hereinafter illustrated, the interface circuit is packaged similar to a relay so as to be mountable along with multiple identical interface circuits on a common printed circuit board, hereinafter called a "smart module," having a local microprocessor which itself is fully operative and fully programmed to carry on the needs and functions of a system, or a substantial portion of the system. The overall function of the local microprocessors may be under the control of a larger and/or remote general purpose master processor which may perform other tasks as well as the management of the complex system described herein. So packaged, it is desirable and preferred to provide in connection with each interface circuit an indicator, preferably in the form of a multi-color LED, for producing a coordinated display representing the states of the command circuit, the controller input circuit and the manual switch. Purely by way of example and not by way of limitation, the LED may be connected to the output circuit to provide a GREEN indication when an input circuit portion of the interface circuit is active, an RED output condition when the output circuit is under the control of the controller and active and an AMBER condition when the manual mode of operation is selected via the manual switch. A fourth condition may be equated to the absence of any color at all from the LED. Of course, multiple single-color LED's may also be used as well s other types of visual indicators.

BRIEF DESCRIPTION OF THE DRAWINGS

FIG. 1 is a schematic diagram of an illustrative interface circuit;

FIG. 3 is a table of logic conditions in the input and output portions of the FIG. 1 circuit as related to operating condition.

DETAILED DESCRIPTION OF THE ILLUSTRATIVE EMBODIMENT

Figure 1A:
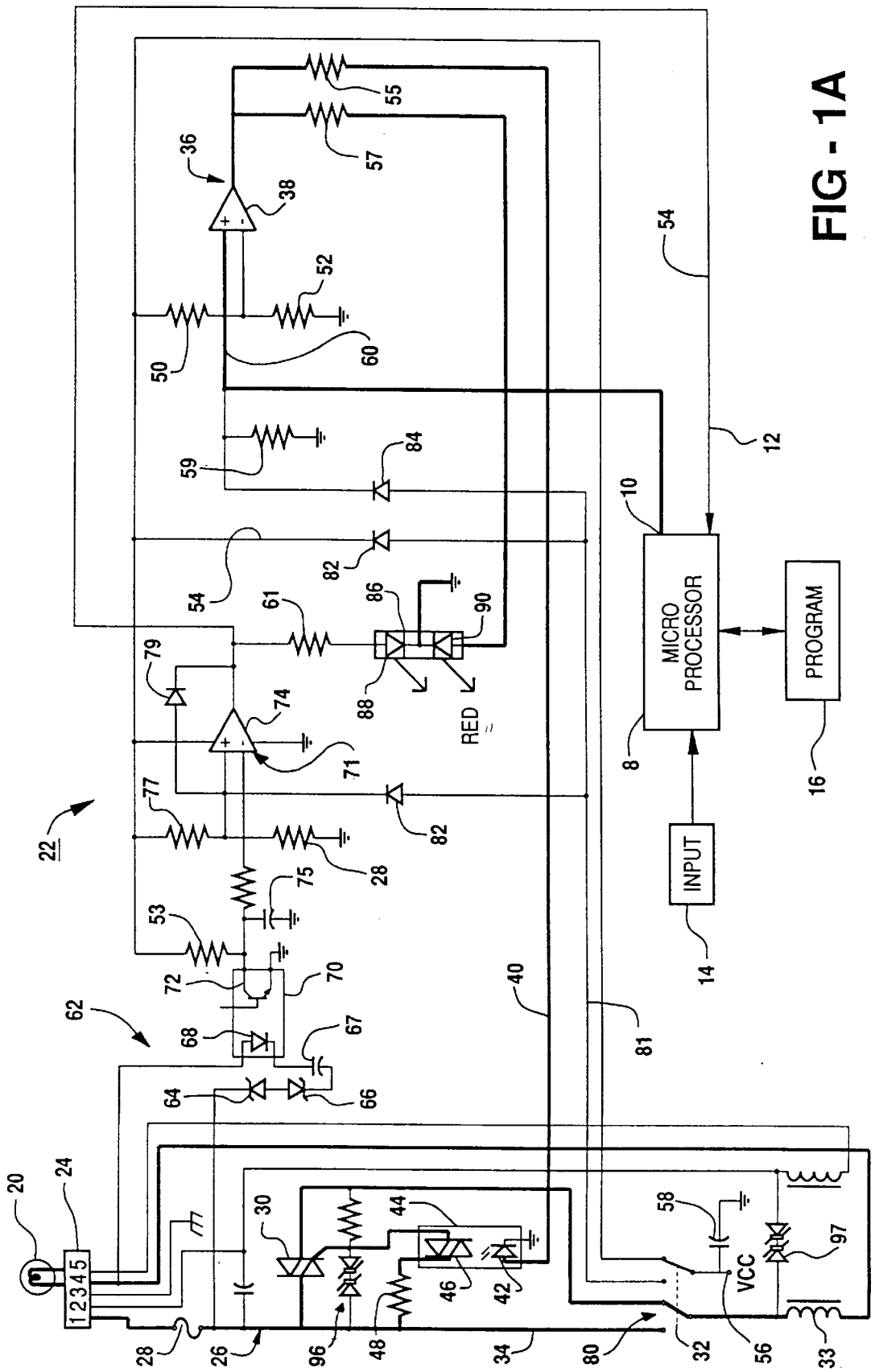
FIG. 1A is a duplicate of FIG. 1 with enhanced representations of those portions of the circuit which are active when the circuit is under controller control, the load circuit is intact and a command output is present.

Referring to FIG. 1 there is shown a circuit 22 for use both as input and output interface between real world electrical devices and a controller in the form of a general purpose digital microprocessor 8 of the type which is capable of producing output commands on digital output bus 10 and receiving data inputs in digital form on digital binary input bus 12. Although shown in FIG. 1 as single lines, busses 10 and 12 normally comprise multiple parallel lines and accommodate multiple devices by way of a multi-bit code. The microprocessor 8 may be and preferably is equipped with an input port 14 by which the microprocessor may receive data from other processors or from input accessories such as a keypad or keyboard. Microprocessor 8 is further provided with a memory 16 for program storage and retrieval.

The circuit 22 as shown in FIG. 1 is connected to an electrical load device schematically represented at 20 which is connected across terminals 4 and 5 of a terminal block 24. The load device 20 is of a type which is capable of doing work and is subject to automatic or programmed coordinated energization by the microprocessor 8 by way of output command line 10 and also by manual operation through a double-pole, double-throw switch 32 as hereinafter described. Circuit 22 comprises six distinct sections: a load device energization circuit section 26 connected between terminals 1 and 4, an output circuit section 36, a sense circuit section 62, an input circuit section 71, a display or indicator 86 and a manual mode select circuit section 80. Details of all six circuit sections are hereinafter described.

The load energization circuit 26 comprises a fuse 28 and a first remotely controllable switch means in the form of a triac 30 which is capable of conducting AC line voltages over a wide range of voltage values and which is capable of being switched between conductive and non-conductive states by means of remote signals applied to a gate circuit through an opto-coupler 44 which couples the load energization circuit 26 with the output circuit 36 as hereinafter described. The energization circuit further passes through the switch 32 and an inductor 33 en route to terminal No. 4 in the terminal block 24.

The output circuit 36 comprises a differential amplifier 38 which produces a high output whenever it receives a command from microprocessor 8. To achieve this, the positive input of amplifier 38 is connected by way of line 60 to the microprocessor output 10 and to the manual mode select circuit 80. The negative input is connected to the junction between bias resistors 50 and 52. The high side of resistor 52 is connected to the input circuit 71 via resistor 53 and via line 54 to the switch 32.

The output of the differential amplifier 38 is connected by way of resistor 55 and line 40 to the LED component 42 of the opto-coupler 44 to close; i.e., render conductive, the AC switch portion 46 of the opto-coupler which interconnects the bias resistor 48 to the gate electrode of the triac 30 in the load energization circuit 26. Differential amplifier 38, therefore, has the capability of controlling the state of conductivity of the triac 30 in the load energization circuit 26. When there is no output command on line 10, the differential amplifier 38 produces a logical low output and the opto-coupler 44 is non-conductive. Therefore the triac 30 is also nonconductive. When the output on line 10 goes high, the differential amplifier conducts activating opto-coupler 44 and the triac 30 also conducts.

The sense circuit 62 connected between terminals 1 and 4 of the terminal block 24 comprises opposite polarity diodes 64 and 66, capacitor 67 and the LED stage 68 of an opto-coupler 70 which couples the sense circuit 62 to the input circuit 71. The sense circuit 62 is of much higher impedance than that of the energization circuit 26 and conducts a small amperage current only when the load 20 is intact; i.e., no open circuit or fault, but neither the triac 30 nor the manual switch 32 is closed to establish current flow in the energization circuit 26. When the triac 30 is conductive, essentially no current flows through the sense circuit 62 because of the much lower impedance of the conducting triac 30 which is in parallel with the sense circuit 62. A no-current condition also exists in the sense 62 circuit 30 whenever the triac 30 is non-conducting but the load is open-circuited due to an internal fault and is, therefore, in a non-operable condition. As used herein, "state" refers to the ON or OFF state and "condition" refers to operable or inoperable. The impedance of the sense circuit 62 to the line voltage is sufficiently high that the power applied to the load device 20 through the sense circuit 62 is insufficient to cause effective operation thereof; i.e. , if the load device is a motor, the sense circuit current, even though enough to excite the sense circuit 62, is not enough to set the motor into motion to do work.

The display device 86 is a three-color LED capable of generating RED, GREEN and AMBER visual outputs. A fourth output state is represented by the OFF condition.

The terminal block 24 connections are as follows:

| Terminal | Application |
|---|---|
| 1, 2 | line voltage |
| 3 | ground |
| 4, 5 | load |

The line voltage may be anything within the capabilities of the triac 30 and is completely isolated from the low voltage circuit components by the opto-couplers. In a practical embodiment voltages from 24 to 220v AC are used. The triac 30 may, of course, be replaced with other types of remotely controllable electronic switches.

The input circuit 71 comprises a second differential amplifier 74 which produces a high output whenever the opto-coupler 70 conducts; i.e, whenever there is current in the sense circuit 62 showing that the load is intact but neither switch 30 nor 32 is closed. To accomplish this, the positive input of amplifier 74 is connected to a junction between bias resistors 75 and 77 and also through a diode 82 to manual select line 81 for purposes hereinafter described. The negative input of the differential amplifier 74 is connected to the high side of capacitor 75 and to the output stage 72 of the opto-coupler 70. When the opto-coupler 70 is non-conductive, the negative input is high and the amplifier output is low. The output of the differential amplifier 24 is connected via line 81 to the data signal input 12 of the microprocessor 8. A diode 79 is connected between the positive input and the output of amplifier 74 for purposes to be described.

In general, when the opto-coupler 70 conducts, the negative input goes low and the output of the differential amplifier 74 goes high to provide a data signal input to the microprocessor 8. This occurs whenever the load 20 is operable; i.e., no faults or open circuits, but neither of the two parallel switches 30 and 32 is closed to actually energize the load 20.

Finally the circuit 22 comprises a manual mode select circuit 80 consisting primarily of the double-pole, double-throw switch 32, line 34 which connects a portion of switch 32 in parallel with triac 30, and diodes 82 and 84 connecting line 81 to the positive inputs of the differential amplifiers 74 and 38, respectively. The three-color LED indicator 86 provides a visual indication of the condition of the energization circuit 26 and the operable state of the load device 20. Indicator 86 comprises an upper GREEN light stage 88 connected to the output of the differential amplifier 74 and a lower RED light stage 90 connected to the output of the differential amplifier 38. In general, whenever only amplifier 74 produces a high output, the LED 88 indicator shows GREEN; whenever only the amplifier 38 produces a high output, the LED 90 shows RED; whenever both LEDs 88 and 90 are active, the indicator 86 shows AMBER. Obviously, when neither of the LED 88 and 90 is active, the indicator 86 is unilluminated or OFF.

Switch 32 has three positions: MANUAL, AUTO and OFF. The OFF position can be anywhere between MANUAL and AUTO. When in the AUTO position, the load energization circuit 28 passes through the triac 30. In this position, a DC source VCC connected to terminal 56 is then connected by line 54 to each of the differential amplifiers 38 and 74. The amplifiers 38 and 74 have high input to the negative input and low output. When in the MANUAL position, the DC bias source VCC is connected by way of line 80 and diodes 82 and 84 to the input and output circuits respectively to create two HIGH outputs. In fact, only amplifier 38 goes HIGH; the HIGH output from amplifier 74 being simulated by the diode 72 which actually applies VCC to the GREEN LED stage 88. This activates both stages of the LED indication 86 to show an AMBER visual indication. When in the MANUAL position, the left side of the double-pole, double-throw switch 32 completes the load energization circuit 26 between terminals 1 and 4 whether or not the triac 30 is conductive.

Capacitor 58 provides a dissipation path for short term voltage transients such as from lightning strikes;, circuit 96 is for signal voltage conditions; and diodes 97 provide noise filtration. Circuit component values for an exemplary circuit are given in Table 1.

Operation

AUTO Mode, Microprocessor On

Referring to FIG. 1A the circuit 22 is shown in the condition when the microprocessor 8 is producing a command signal on line 10 and the double pull double throw switch 32 is in the right hand position; i.e., the AUTO position. Under these circumstances, the load energization circuit 26 is established through the triac 30 and, because differential amplifier 38 is receiving a command signal on line 10 the output of the amplifier 38 is high. This high output is applied by way of line 40 to the LED side of the opto-coupler 44 to activate the gate electrode and render triac 30 conductive. The high output of amplifier 38 is also applied to the lower stage 90 of the indicator LED 86 to produce a RED visual indication which is equated with the active or energized condition of load 20 in the AUTO mode.

Because a low impedance, high power-level energization circuit 26 through the triac 30 is conductive, there is insufficient current through the high impedance, lower power-level sense circuit 62 to activate the opto-coupler 70 and the output of differential amplifier 74 is low; there is neither a data signal input to the microprocessor 8 nor activation of the upper or GREEN stage 88 of the LED indicator 86. In short when, the microprocessor 8 commands energization of the load device 20, high power-level energization is completed through triac 30 and the logical combination of input and output to the microprocessor 8 is as shown in FIG. 3. The term "high power-level energization" means that the load device receives sufficient power from the line source to do work.

Operation

AUTO Mode On, Load Open Circuited

Figure 1B:
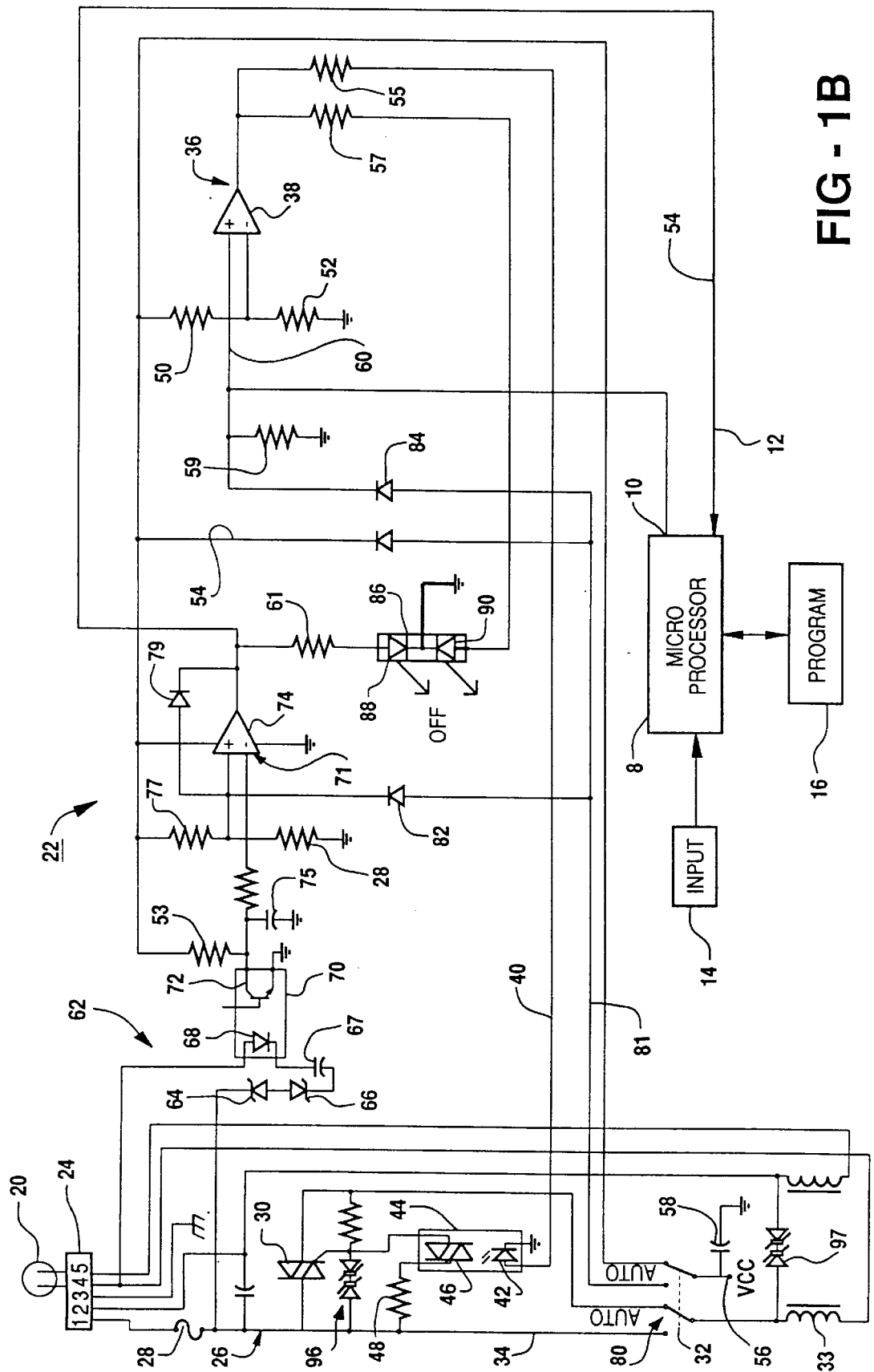
FIG. 1B is a duplicate of FIG. 1 with enhanced indications to show those portions of the circuit that are active when the circuit is under the control of the controller and an electrical load device controlled thereby is defective and open circuited.

Referring now to FIG. 1B, the active portions of the circuit 22 are illustrated in enhanced fashion under those conditions which obtain whenever the switch 32 is in the AUTO position, the microprocessor 8 is commanding an output or energization of the load 20 but the load, because of an internal fault or open circuit, does not conduct.

Under these conditions, the differential amplifier 38 produces a low output so the RED side of the energization circuit 26 is non-conducting. The live voltage is applied only to the sense circuit 62. However, the defective load 20 permits no current to flow through the sense circuit 62 and the inputs to the amplifier 74 produce a low output. The GREEN side 88 of the LED indicator 86 is also unilluminated. The OFF condition of indicator 86 represents a failure in the load device 20.

AUTO Mode On, Microprocessor Off

Figure 1C:
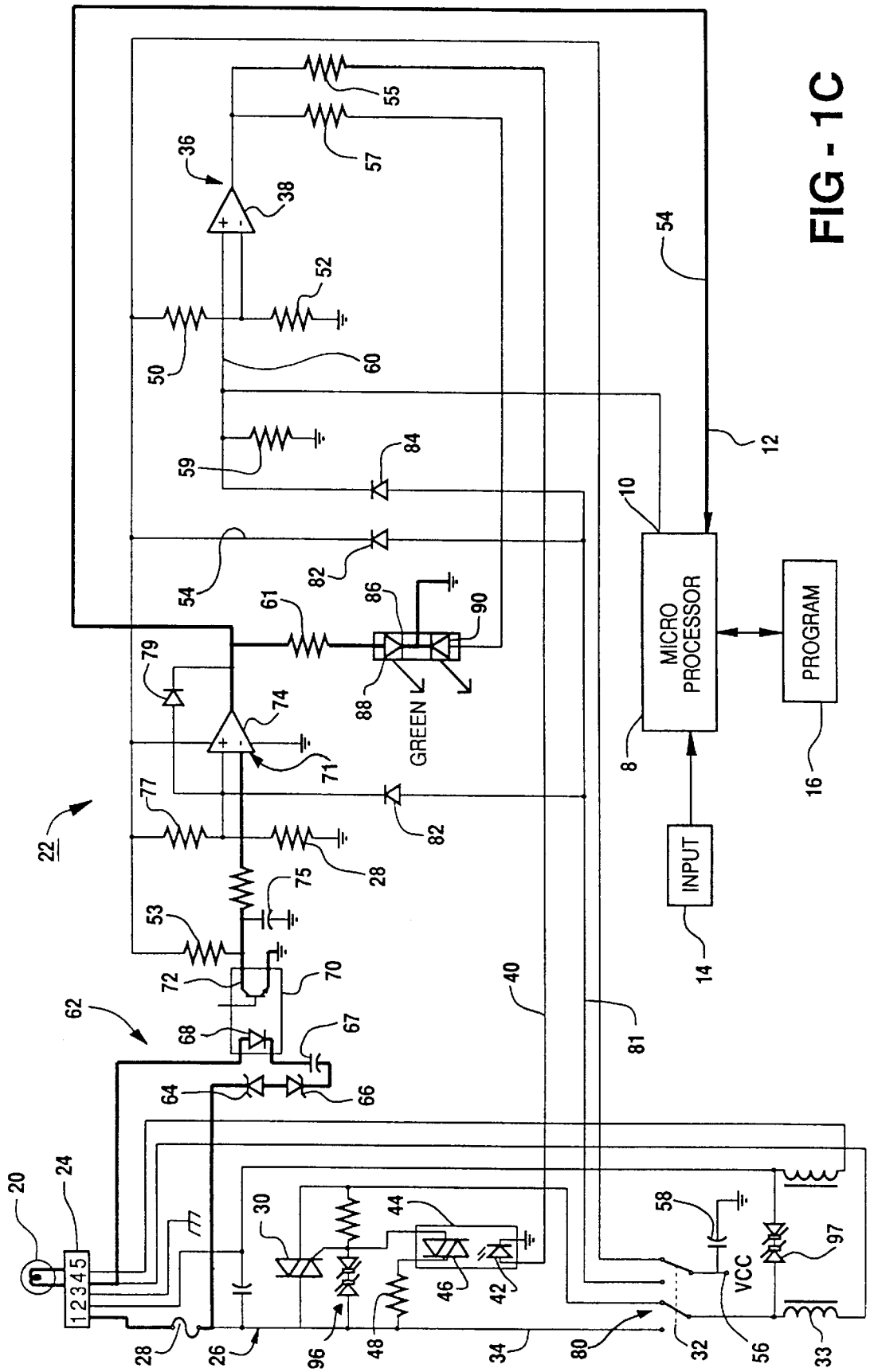
FIG. 1C is a duplicate of FIG. 1 with enhanced representations of those portions of the circuit which are active when the circuit is under the control of the controller, no command signal is generated and the load device is unenergized but operative; i.e., no open circuits or faults.

Referring to FIG. 1C, those portions of the circuit which are active when the switch 32 is in the AUTO mode but the microprocessor 8 is producing no output command are shown in enhanced fashion. As shown in FIG. 1C, the load 20 is intact; i.e, there are no internal open circuits or faults.

Because there is no command signal on line 10, the output of differential amplifier 38 is low and triac 30 is non-conductive. There is, however, a high resistivity circuit completed from the source of potential associated with the load 20 through the diodes 64 and 66 of the high resistivity sense circuit 62 in sufficient quantity to activate the LED stage 68 of the opto-coupler 70. This applies a low signal to the negative input of amplifier 74 and turns the differential amplifier output high. The high output condition of the differential amplifier 74 turns the GREEN LED section of the visual indicator 86 on as shown in the contents of Table 2. The GREEN condition is consistent with the selection of the AUTO mode, and an intact load in the absence of a command. In other words, the load is intact but in the standby or unenergized condition of the AUTO mode.

MANUAL Mode Load Intact

Figure 1D:
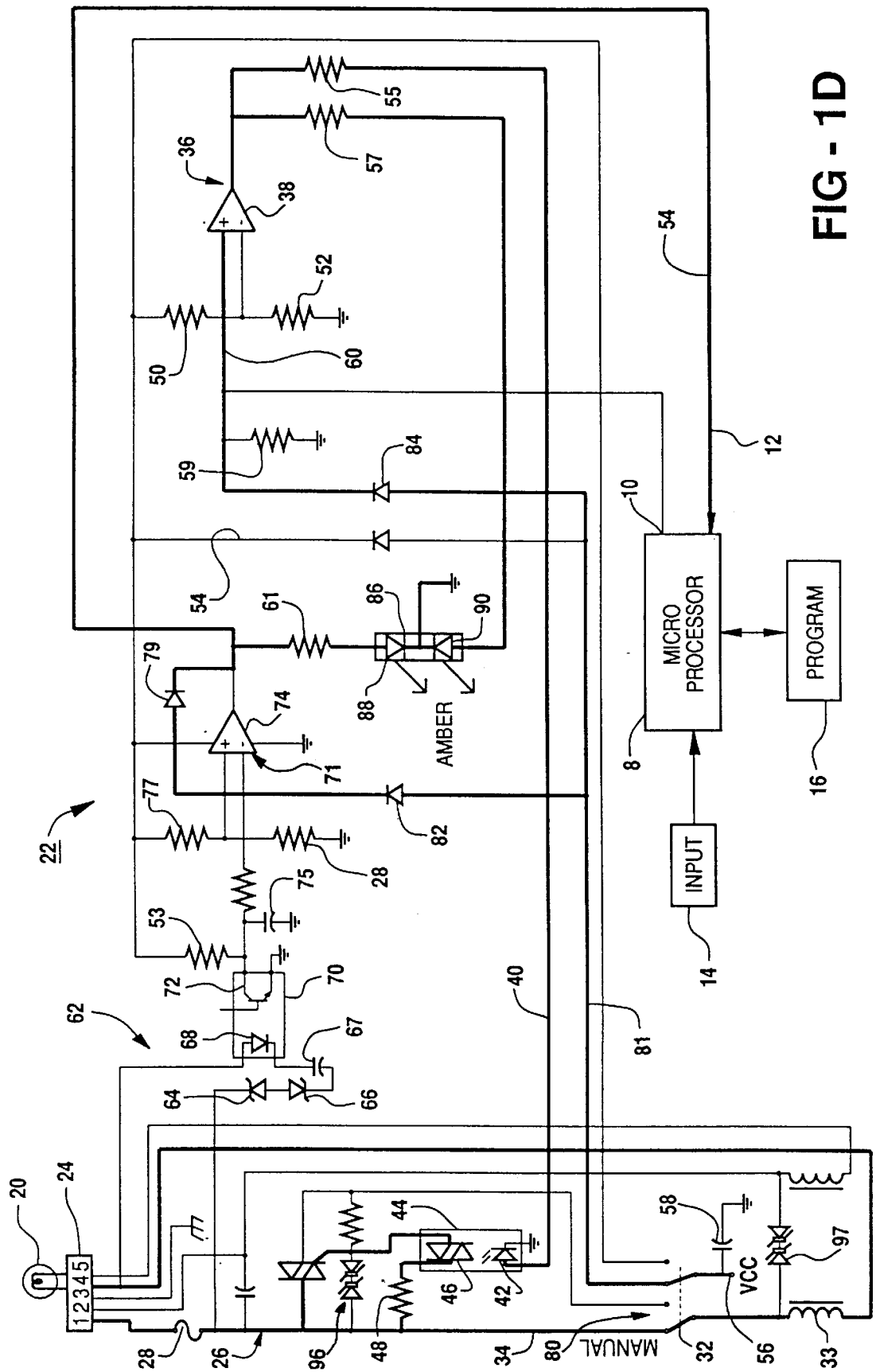
FIG. 1D is a duplicate of FIG. 1 with enhanced representations of those portions of the circuit which are active when a manual operation of an output device is selected and the device is operable; i.e., no open circuits or faults are present.

Referring now to FIG. 1D circuit 22 is shown in the condition which occurs whenever the switch 32 is moved to the MANUAL position and the load is intact.

The right side of the double-pole, double-throw switch 32 connects the DC source VCC to the positive inputs of each of the differential amplifiers 38 and 74. Amplifier 38 goes high to activate the lower or RED portion of the LED indicator 86. The high voltage signal through diode 84 is conducted around amplifier 74 through diode 82 to the input line 12 to the microprocessor 8 and to the upper or GREEN section 88 of the LED indicator 86. Because both RED and GREEN annunciators 90 and 88 are on, the composite output color is AMBER. The energization circuit 26 is completed through the switch 32 but not through the triac 30 even though the gate electrode receives a high signal. The fact that one of the two parallel switches 30, 32 is closed prevents any significant current flow through the sense circuit 62 and the opto-coupler 70 remains off. The opto-coupler 44 is active but the triac switch 30 cannot conduct because of the open circuit at switch 32.

From the foregoing it is apparent that the AMBER display from the visual indicator 86 is associated with the selection of the manual mode no matter what the condition of the load 20. It is possible for the operator of the system to determine by visual inspection of the circuit 22 in physical form that the switch 32 is in the manual position and that manual operation of a load device is underway. It is a simple manner to logically identify those lines in the program 16 associated with the microprocessor 8 with a particular load device and load circuit. Therefore, a record can be readily made in the microprocessor 8 and stored as data for incorporation into a log or report to be made at regular intervals or on demand to advise management that a load device had been activated at a particular time. As hereinafter described this can be associated with a clock signal so that the time of day and the duration of the manual selection of the particular load device can be identified.

Input Condition

Figure 1E:
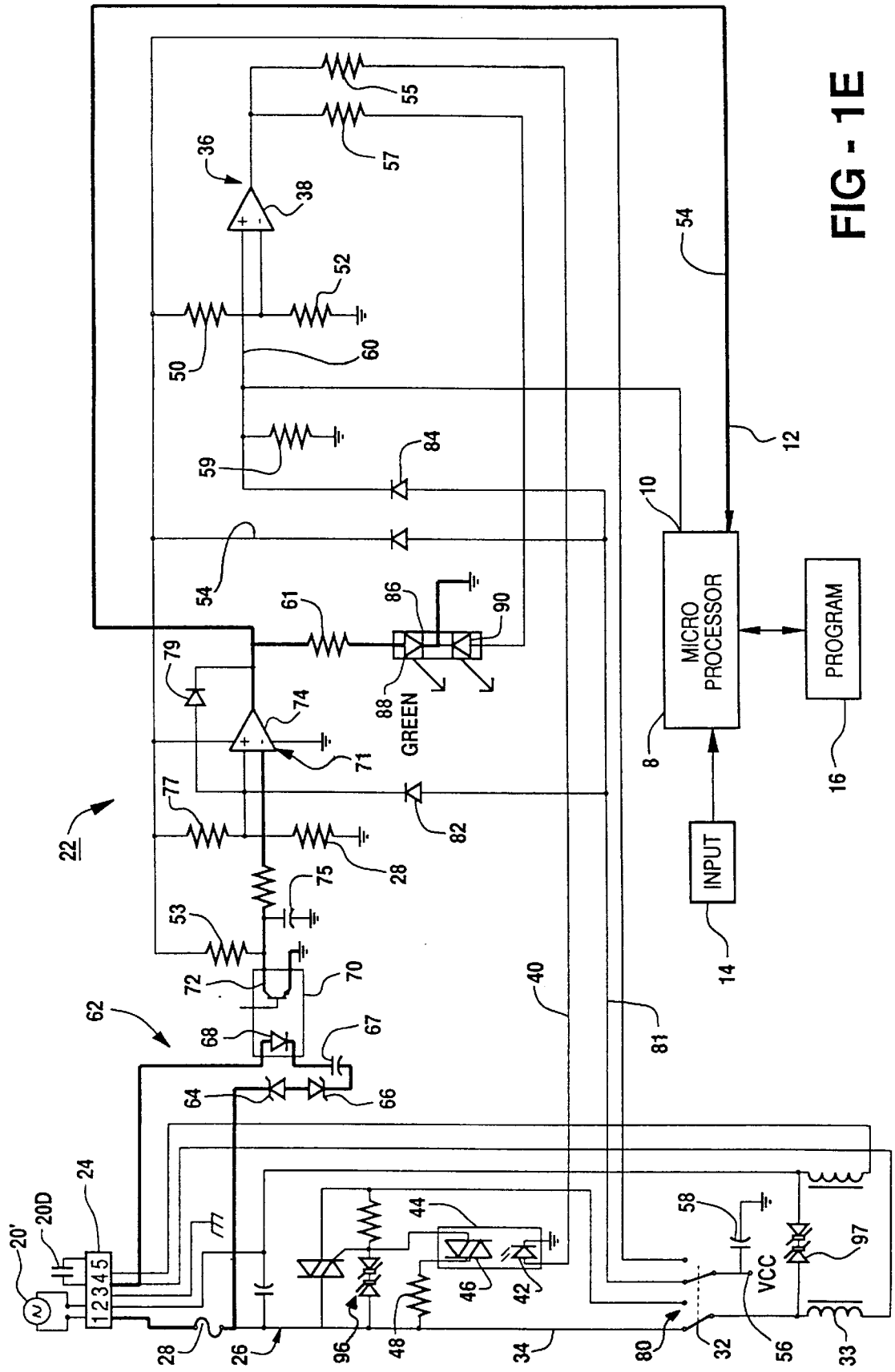
FIG. 1E is a duplicate of FIG. 1 with enhanced representations of those portions of the circuit which are active when used solely in connection with an input device which is closed circuited and, therefore, sending an input signal to the microprocessor.

Referring now to FIG. 1E the circuit 22 is shown with enhanced portions to illustrate those elements which are active when the associated device is in the "input" class; i.e., is connected between terminals 1 and 2 and is merely a condition-signaling device rather than a motor or solenoid device which does work. The function of circuit 22 is essentially to produce a high signal condition on line 12 when the load 20' is a closed circuit and a low signal condition when the load 20' is an open circuit.

To utilize the circuit 22 in the input mode it is necessary to connect a "dummy" load 20D across the terminals 4 and 5. The dummy load 20D preferably assumes the form of a small capacitor to provide a current path through the circuit 26. The actual input device 20' is connected across terminals 1 and 2 such that when the terminals or contacts of the device 20 close, a circuit is formed between the source of potential and the sense circuit 62 to activate the LED stage of the opto-coupler 70 and provide a signal to the negative input of the differential amplifier 74. When the negative input goes low, the output goes high and a data signal on line 12 to the microprocessor 8 is created.

As stated above, all of the individual input lines 12 are logically identified by the program portion 16 of the microprocessor 8 with a particular device or location in an industrial system such that each input line has its own "device identity" in the overall coordination program. The high output from differential amplifier 74 also activates the GREEN stage 88 of the LED indicator 86 advising the operator that an input device is in the closed circuit or active condition.

As will be hereinafter apparent, when the circuit 22 is used in multiples on a common circuit board, they can be labeled as to their association with specific input and output devices so that the attendant or operator can tell at a glance which input and/or output devices are either close circuited (input device) or in the AUTO mode and in standby (output device). Alternatively, the attendant can be provided with a location key from which it is possible to determine the identities of the various LED indicators and their associations with the various input and output devices in the particular system being controlled.

Industrial Application

Figure 2:
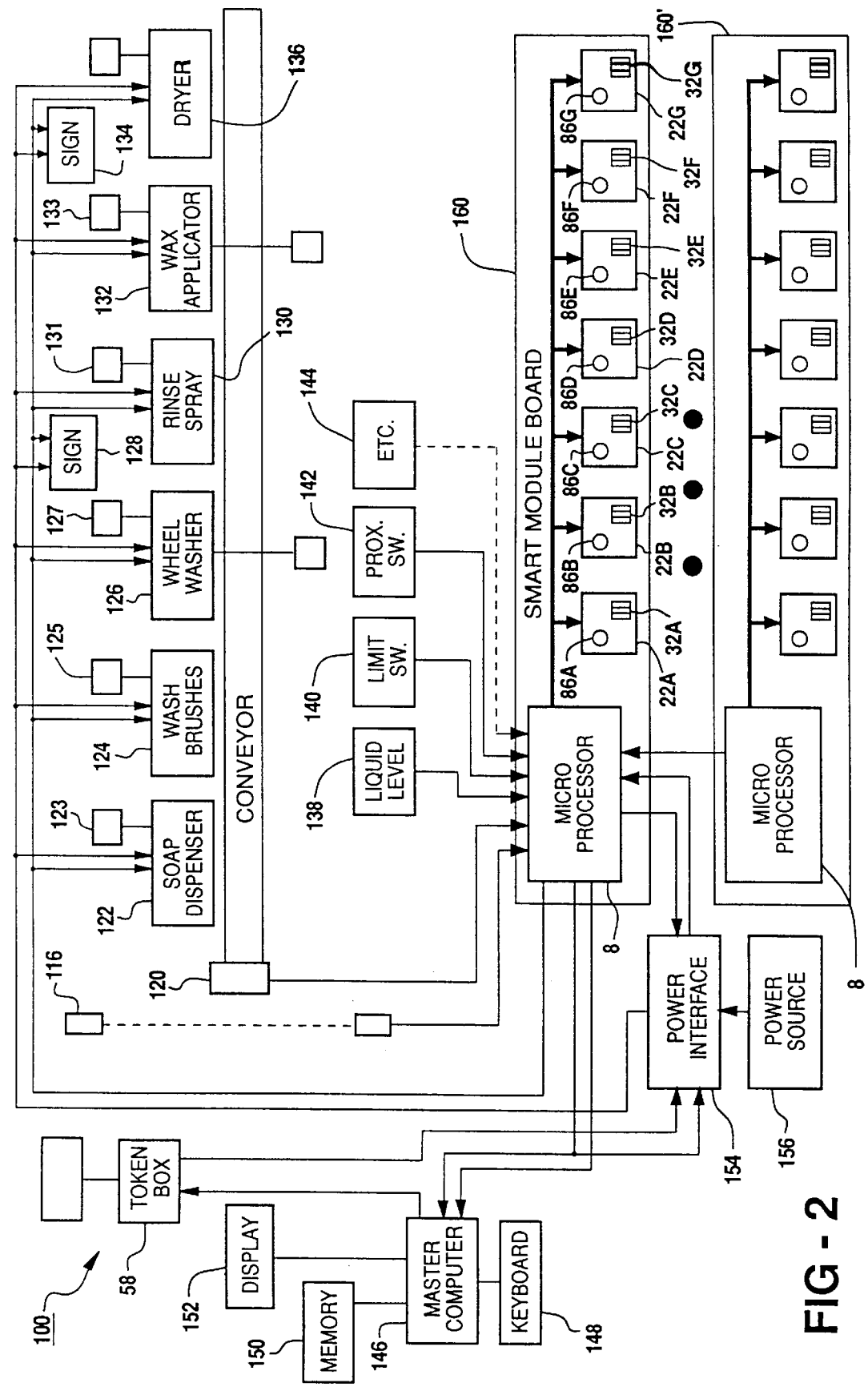
FIG. 2 is a block diagram of a vehicle laundry utilizing multiple interface circuits of the type disclosed in FIG. 1 on a common circuit board for controlling the functions of various electrical devices in a computer controlled, multi-function vehicle laundry.

Referring now to FIG. 2, there is shown a block diagram of a vehicle laundry 100 comprising a representative combination of input and output devices at least some of which are under the control of a smart module 160 comprising the microprocessor 8 mounted on a circuit board along with a set of seven interface circuits 22A through 22G. The number seven is arbitrary and chosen to represent the desirability and practicality of mounting a plurality of interface circuits on a common circuit board for local control of a lower hierarchy microprocessor 8 in a system having a higher hierarchy master computer 146. Computer 146 is preferably capable of managing not only multiple microprocessors 8 associated with various components and/or devices of an operating vehicle laundry but also capable of performing other data processing and retrieval tasks such as financial management, maintenance scheduling, employee attendance and payroll as described generally above.

Referring further to FIG. 2, the vehicle laundry system 100 comprises an electric motor-driven conveyor 112 which urges vehicles (not shown) along the entire length of a wash/dry lane equipped with a strategically arranged sequence of stations equipped with a first class of electrical devices for sensing conditions pertinent to the operation of the vehicle washer and dryer system and for producing inputs to the smart module microprocessor representing those conditions. System 100 further comprises a second class of devices which are located at the stations along the conveyor and which can, when called into action, perform vehicle laundering and related functions. Some of these functions are employed in every wash/dry cycle and others are selectively employed according to the wishes and willingness of the customer to pay. The first class of devices include, by way of example, controlling or input devices including an electric eye 116 aimed across the vehicle entry point to detect the entry of the vehicle into the wash lane and, where desired, to accurately measure the length of the vehicle by relating the time the beam is broken to the speed of operation of the conveyor 112. The input devices further comprise a shaft angle encoder 120 which is integral with a conveyor sprocket to generate pulses representing increments of conveyor motion whereby the position of the vehicle as it progresses through the wash lane can be accurately determined at all times.

Devices in the second class which make up the vehicle washer and dryer system comprise, by way of example, a soap dispenser 122 consisting of a fluid reservoir, a pump, a solenoid valve and appropriate plumbing as will be apparent to those skilled in the art. The controlled devices further comprise vehicle contacting washer brushes 124 which are also conventional and may, for example, comprise horizontal or overhead brushes driven by motors and supported on appropriate movable suspension systems as well as vertical or side brushes also equipped with motors for rotation purposes and mounted on suitable carriages and/or suspension systems to operate on the sides of the vehicle and/or to wrap around the vehicle to contact front and rear surfaces as well. The controlled or output devices further comprise a conventional wheel washer 26 which may be selectively employed to perform special washing operations on wheels and tires. A sign 128 associated with the wheel washer 126 is also among the output or controlled devices and consists of fluorescent or incandescent signage to signal the customer that the wheel washing operation he or she selected as part of the vehicle treatment package is actually operating. The controlled devices further comprise a conventional rinse spray 130 also equipped with valves, pumps and fluid reservoirs as desired to rinse the wash water and soap from the surfaces of the vehicle. Rinse spray 130 is followed by an optionally energized wax applicator station 132 which is another conventional output device and associated therewith a fluorescent or incandescent sign 134. Finally, the output devices comprise an arrangement of dryer blowers consisting of electrically operated turbines, plenum chambers, conduit and appropriate nozzles to remove the wash and rinse water from the exterior surfaces of the vehicle.

The controlling or input devices associated with the laundry system 100 further comprise one or more liquid level detectors 138 associated, by way of example, with soap and chemical reservoirs, limit switches 140 used to detect or verify vehicle proximity or presence, proximity switches 42 used to detect or verify the position of various mechanical components in the system and other devices 144 which may comprise additional photoelectric eyes, carbon monoxide detectors and emergency stop buttons.

In the system of FIG. 2, all of the components and devices of the vehicle washing and drying system are normally operated and programmed under the control of a master computer 46 which is preferably located in an attendant station, a convenience store or other facility associated with the vehicle laundry 100. The master computer can be any of a variety of commercially available digital processors, usually the so-called "mini computers" and has associated therewith a conventional input keyboard 148, hard drive, floppy disk or other associated memory 150 and a conventional display screen 152.

The computer 146 has an output connected to a power interface 154 which consists of appropriate transformers, circuit breakers, analog-to-digital converters, inverters and rectifiers as necessary to interface power from conventional sources 56 from power interface 154 to one or more intelligent controller boards 60 hereinafter described in detail. It will be apparent in the following description that numbers in FIG. 2 correspond to reference numbers for identical elements in FIG. 1 but that characters A through G have been added in FIG. 2 where multiple elements are used.

The smart module control board 160 comprises an on board microprocessor 8 which operates to coordinate the operations of the output devices 122, 124, 126, 128, 130, 132, 134 and 136 with the condition signal generating input devices 116, 120, 138, 140, 142 and 144 and to ensure that the laundry 100 operates in accordance with the sequence established by the master control program 146 when it is used to initialize the microprocessor 8 in establishing the basic program or sequence of operations.

The microprocessor 8 is connected to each of a series of interface circuits 22A–22G, the particular number being arbitrary and illustrative; in a practical embodiment, the user may find it convenient to use more or fewer interface circuits per board 160 and a number of such boards per operating system.

Each of the interface circuits 22A–22G is associated with either an individual controlling (input) device or a controlled (output) device in the laundry loo to operate either as an input logic level signal interface or an output logic level signal interface between that device and the microprocessor 8. In addition, the interface serves to provide both local control for manual operation purposes and an annunciator function to visually indicate the operating state of the associated device. The manual operation function is provided by way of manual switches 32A through 32G associated with interfaces 22A through 22G, respectively. The annunciator function is provided by way of three-color LEDs 86A through 86G associated with respective interface circuits 22A through 22G.

By way of example, interface circuit 22A is associated with the shaft angle encoder 120 of the conveyor to function as an input logic level signal interface and to provide an input signal to the microprocessor 8 indicating the operating state of conveyor; i.e., that the conveyor is or is not propelling one or more vehicles through the system. Interface 22B may, by way of example, be associated with the soap dispenser 122 and may be locally programmed by way of the microprocessor 8 so that the valve which opens to permit. soap to be dispensed cannot be operated unless the microprocessor 8 receives inputs forming a logical combination of:

a) high signal indicating that soap reservoir is not empty;

b) high signal indicating that pump motor is on;

c) low signal indicating no emergency stop;

d) high signal indicating that conveyor is operating; and e) high signal indicating that a vehicle is in the soap area.

If all of these conditions are satisfied, the microprocessor 8 generates an output signal to the interface circuit 22B turning the soap dispenser on; i.e., opening the soap valve. As described above, a further condition to be satisfied is that the three-position switch 32B associated with the interface 22B is in the AUTO position and not in either the "MANUAL" or "OFF" position. Similar logical input requirements are established in microprocessor 8 for each of the output devices thereby establishing a control logic which is independent of the master computer 146; i.e., the portion of system 100 wired through board 160 is and remains operable even in the event of a failure of the master computer 146.

In conventional fashion, the master computer 146 is also connected to activate a keypad or token receiver 158, the output of which is connected to the power interface 154 to power up the vehicle washing and drying system at the appropriate time after a customer has made a purchase and selected the components of the vehicle treatment he wishes to have applied; e.g., he may wish to omit either or both of the wheel wash or wax applicator. As indicated, the device may be wired around the keypad or token box to permit direct powering up of the interface 154 from the computer 146.

Master computer 146 may be equipped with a variety of operating systems and application systems including the popular Windows software to assist in establishing appropriate displays in programming one or more microprocessor 8. As is well known in the art, the master computer 146 and the microprocessor 8 may also function as event monitors; e.g., the microprocessor 8 may make a record of the activation or energization of any of the output devices 122, 124, 126, 128, 130, 132, 134 and 136, the time of day of such operation, the length of such operation, the need for maintenance, the time and duration of a system failure or breakdown, etc. The master computer 46 may also be provided with additional programs to provide management information and management functions such as maintenance programs, sales record, accounting and personnel employment and attendance records.

In normal operation, the master computer 46 is operated by way of keyboard 148 and the display 152 to activate the token receiver 58 and to activate the power interface 154. The customer places a token received by him or her from the attendant into the token box 158 as he approaches the entry of the laundry 100. Alternatively, the customer enters a numerical code via a keypad which may be substituted for the token box 158 where desired, thereby to start or enable the start of the operation of the vehicle wash and dryer system. As the vehicle approaches the entry, it breaks the beam created by electric eye 116 and enters the conveyor 118. Breaking the beam of electric eye 116 provides an input signal to microprocessor 8 which, along with other logically combined signals, commands the appropriate interface circuit 22 to turn ON the conveyor motor and activate the shaft angle encoder 120. As the vehicle progresses through the wash lane, urged forward by the conveyor 118, the selected combination of output devices 122, 124, 126, 128, 130, 132, 134 and 136 is activated or energized in the appropriate sequence and turned OFF as the vehicle passes that station, all under the control of the interfaces in the appropriate board 160. This, of course, assumes that all of the three-position switches 32A through 32G is in the "AUTO" position.

In the event the computer 146 fails, it is possible to continue to operate the vehicle washer/dryer system to the extent power remains available because the operational programming is provided by local microprocessors 8 on boards 160. Moreover, it is possible to energize undivided devices by manually turning ON the device via the switch 32. Since the logical interrelationship between all of the input and output devices and the functions performed thereby is controlled by programming in the local microprocessors 8, full system operation independent of the master computer 146 is possible. In addition, it is possible to selectively disable or omit certain of the functions provided by the devices in the vehicle laundry simply by moving the manual three-position switches associated therewith on the smart module board 160 to the "OFF" position.

By way of summary, the circuit board 60 provides an intelligent module by which a plurality of input and output devices can be associated with one another in a predetermined programmed way whereby operation of an output device is logically conditioned on a number of input signal conditions associated with one or more input devices or other output devices. Because this programmed interrelationship is local to the operating system; i.e., resident in the memory of the microprocessor 8, it is subject not only to continued operation in the events of the failure of the master computer 146, but can also be customer tailored to produce a selected sequence of operations wherein one or more functions is included or omitted, simply by selectively turning output devices by way of the three-position switch 32. The annunciator LEDs associated with the function submodules provide immediate visual indication of the operating condition of each device; i.e., in the AUTO mode, in the MANUAL mode, or OFF. The annunciator LED also indicates a failed or FAULT condition by going out when the associated device fails for some reason; e.g., an open circuit or short circuit develops. Accordingly, the smart modules 160 perform a number of important functions from local logical programming to manual operation to fault detection to manual operation event recording.

While the system of the present invention has been described with reference to use in a vehicle laundry, it is to be understood that the invention and in particular the circuit boards 160 may be employed to advantage in any of a variety of multi-function systems wherein a logical interrelationship between the devices causing or producing the functions and devices whose operating states act as logical conditions to the satisfactory performance of system operations are employed. The applications software stored in memories 16 and 150 can take many forms. Echelon, by way of example, offers a suitable commercial software product under the trade name LonWorks. Various examples of such application has been given above.

TABLE 1

| | |
|---|---|
| R50 | 33 K ohm |
| R52 | 33 K ohm |
| R55 | 249 ohm |
| R57 | 249 ohm |
| R59 | 33 K ohm |
| R61 | 249 ohm |
| R78 | 8.25 ohm |
| R76 | 33 K ohm |
| R53 | 475 ohm |
| C67 | 1 MF @ 250 $V_{AC}$ |
| R96 | 330 ohm |

We claim:

1. A relay type interface circuit for an electrical device comprising:

means defining an energization circuit adapted to be connected said electrical device and a source of electrical power;

said energization circuit including a first remotely controllable switch for opening and closing the circuit to the flow of electrical energy;

current sensing means connected to the energization circuit for producing a first output when the energization circuit, including the device, is conductive but the first switch is open and a second output when the first switch is closed, a resistivity of said current sensing means being substantially greater than a resistivity of the energization circuit; and means for remotely controlling the state of the first switch.

2. An interface circuit as described in claim 1 wherein the current sensing means includes an opto-coupler.

3. A circuit for interfacing an electrical device having conductive and non-conductive conditions with a controller of the type which produces commands for controlling the condition of an electrical device and which processes signals supplied thereto representing the condition of an electrical device comprising:

a) a load energization circuit adapted to be connected between the electrical device and a source of electrical power, said circuit including a remotely controllable first switch for opening and closing the circuit and, a second switch for opening and closing the circuit independently of the first switch;

b) current sensing means coupled to the power circuit for producing a signal representing the conductive condition of the circuit and the electrical device;

c) logic circuit means for receiving commands from the controller and for generating a control signal, the logic circuit means including a differential amplifier;

d) means for coupling said control signal to said first switch for controlling the condition of the remotely controllable first switch according to the data content of the command;

e) the controller being a microprocessor having inputs and outputs, the current sensing means being connected to an input and said logic circuit means being connected to an output; and f) an opto-coupler connected between the output of the differential amplifier and said load energization circuit and further wherein said first switch is a solid state switch device having a gate electrode connected to a high voltage side of the opto-coupler.

4. A circuit for interfacing an electrical device having conductive and non-conductive conditions with a controller of the type which produces commands for controlling the condition of an electrical device and which processes signals supplied thereto representing the condition of an electrical device comprising:

a) a load energization circuit adapted to be connected between the electrical device and a source of electrical power, said circuit including a remotely controllable first switch for opening and closing the circuit and, a second switch for opening and closing the circuit independently of the first switch;

b) current sensing means coupled to the power circuit for producing a signal representing the conductive condition of the circuit and the electrical device;

c) logic circuit means for receiving commands from the controller and for generating a control signal;

d) means for coupling said control signal to said first switch for controlling the condition of the remotely controllable first switch according to the data content of the command;

e) the controller being a microprocessor having inputs and outputs, the current sensing means being connected to an input and said logic circuit means being connected to an output; and said current sensing means including an opto-coupler having a high voltage stage connected in parallel with at least a portion of said load energization circuit and a low voltage side connected through a differential amplifier to an input of the microprocessor.

5. A circuit for interfacing an electrical load device with a controller of the type which produces control commands for activating and deactivating an electrical load device and which processes data signals applied thereto in accordance with a stored program comprising:

a) a load circuit between the electrical load device and a source of electrical power, said circuit including at least a first remotely controllable switch for opening and closing the circuit;

b) current sensing means coupled to said switch for producing an output signal when the switch is open but the load device is operative;

c) first logic circuit means coupled to said current sensing means for producing an input signal to the controller in response to the output signal;

d) second logic circuit means connected to receive commands from the controller and for assuming states representing the content of the commands from the controller received thereby; and the first and second logic circuits including differential amplifiers coupled to the respective first and second logic circuits through opto-couplers for isolation from the load circuit; and e) means for rendering the remotely controllable switch conductive and non-conductive for controlling the application of power to the load device in response to the state of the second logic circuit.

* * * * *